J. A. JONES.
TRAP NEST FOR HENS.
APPLICATION FILED SEPT. 11, 1916.
1,221,540.
Patented Apr. 3, 1917.
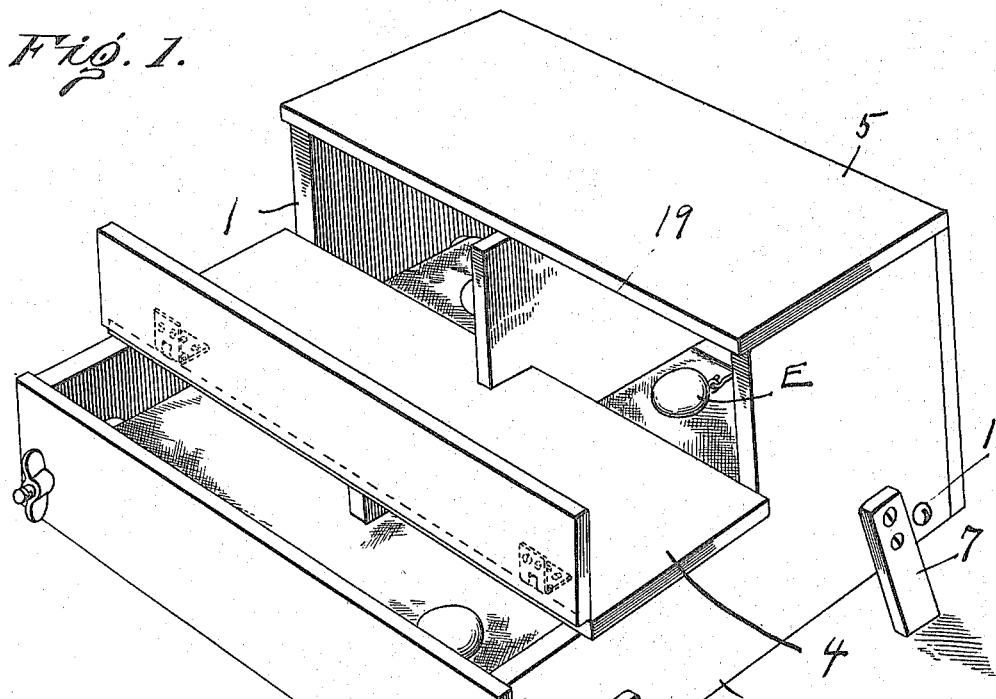
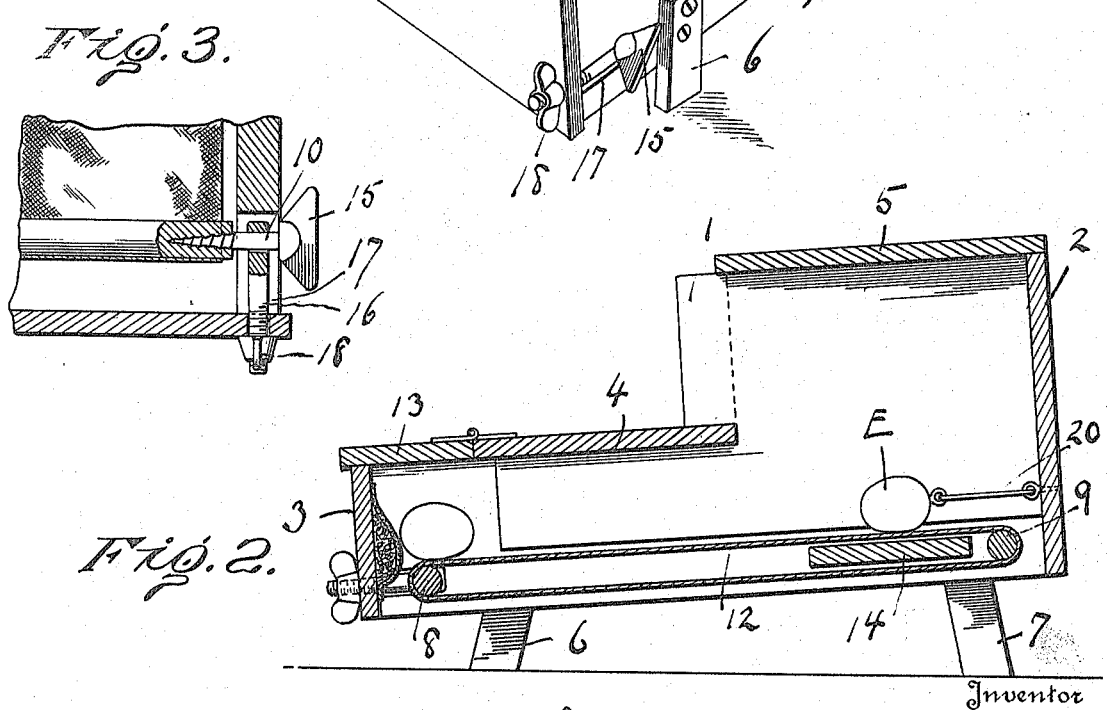

UNITED STATES PATENT OFFICE.

JOHN A. JONES, OF FARMINGTON, MAINE.

TRAP-NEST FOR HENS.

1,221,540.  Specification of Letters Patent.  Patented Apr. 3, 1917.

Application filed September 11, 1916. Serial No. 119,572.

*To all whom it may concern:*

Be it known that I, JOHN A. JONES, a citizen of the United States, residing at Farmington, Franklin county, and State of Maine, have invented and discovered certain new and useful Improvements in Trap-Nests for Hens, of which the following is a specification.

The present invention relates to trap nests for hens and consists in the combinations and arrangements of parts hereinafter described and particularly set forth in the accompanying claims.

The invention has for its purpose to provide a trap nest having a laying chamber and an egg receptacle, in such relation that the eggs, as laid, will of themselves roll into the receptacle and be thereby removed from breakage or other interference on the part of the hen; and which receptacle is adapted to contain a number of eggs, all removed from the laying chamber, and in such position that they may be taken out without disturbing the hen while laying.

The invention has for its further purpose to provide a device of this character having a movable and endless belt that forms the nest bottom and supporting surface for the eggs in the receptatcle, and having means for shifting the belt to the end that the surface thereof may be cleaned without interfering in any way with the apparatus when in use.

The invention is shown by way of illustration in the accompanying drawings, wherein—

Figure 1 is a perspective view thereof and showing the egg receptacle open,

Fig. 2 a longitudinal sectional view of the same, and

Fig. 3 an enlarged detail view, partly in section, of the mounting of one of the belt rollers.

Referring to the construction in detail and with like reference characters indicating corresponding parts in the different views shown, the device consists of a casing constructed of side walls 1, a rear wall 2, front wall 3, and top walls 4 and 5 that are separated a proper distance to give free entrance to the hen for entering the laying chamber. The casing, as a whole, is adapted to be swung from suitable supports, or mounted on a plurality of feet 6 and 7, after the manner illustrated in the drawings.

A pair of rollers 8 and 9 is journaled in the side walls 1 of the casing on the screws 10 and 11, respectively, or in any other manner that will allow the rollers to turn freely. An endless belt 12, of canvas or other suitable material, is supported by and travels upon the pair of rollers 8 and 9 and provides a bottom for the laying chamber and the supporting surface for the eggs contained within the receptacle; and said belt is inclined downwardly toward the receptacle to the end that the eggs will, of themselves, roll into the receptacle and well out of reach of the hen. A door 13 is hingedly mounted on the top piece 4, giving access to the egg receptacle, after the manner illustrated in Fig. 1.

A cross piece 14 is located between the parts of the belt within the laying chamber and, with the upper belt length, provides the supporting surface for the fowl; and the underside of the casing is left open throughout, to the end that the surface of the belt 12 may be readily cleaned without requiring entrance into the casing proper.

The belt is adapted to be shifted for cleaning, or for other cause, through the medium of a pair of thumb pieces 15 (one being shown) formed on the screws 10 and said screws are further journaled in the adjustable bolts 16 that are located within slots 17 for the purpose of adjustment by the wing nuts 18. By this provision (*i. e.* the adjusting means) the belt may be tightened or loosened, as desired.

A partition 19 is located within the casing and divides the same into two compartments, and it will be understood that the casing may be constructed of any size and have as many of these compartments as desired. It is further proposed to have a nest egg E located at all times within each laying chamber, and to this end the same is held in place by any appropriate form of fastening device 20.

It will therefore be seen from the foregoing, that a sanitary trap nest is provided, which is accessible at all times and which may be cleaned without interference with its operation. And it will be further noted that the device employs but few parts, that are little likely to get out of order, and that the construction, as a whole, is of simple design and may be manufactured at small cost.

It is obvious that those skilled in the art may vary the details of construction and arrangement of parts without departing from the spirit of my invention, and therefore I do not wish to be limited to such features except as may be required by the claims.

Having thus fully described my said invention, what I claim as new and desire to secure by Letters Patent, is:

1. In a trap nest, the combination of a casing constructed to provide a single compartment forming a laying chamber and an egg receptacle, and an inclined and endless belt extending from said laying chamber to the egg receptacle over which the eggs are adapted to travel, said belt providing a support for the fowl and adapted to be shifted to have the egg supporting surface thereof cleaned, substantially as set forth.

2. In a trap nest, the combination of a casing constructed to provide an open laying chamber and a closed egg receptacle, and having an open bottom, a pair of rollers journaled in the casing, an endless and inclined belt mounted to move on said rollers providing a support for the fowl and adapted to support the eggs in traveling from said laying chamber to the receptacle, and means for shifting the belt to clean the surface thereof from the open bottom of the casing, substantially as set forth.

3. In a trap nest, the combination of a casing constructed with a raised open section providing a laying chamber and with a closed section froming an egg receptacle, a cross piece located in the laying chamber, a pair of rollers located respectively in the laying chamber and egg receptacle, an endless and inclined belt mounted to travel on said rollers and located adjacent the cross piece, said cross piece and the belt providing a support for the fowl, and a hand operated device for turning one of said rollers to shift the belt, substantially as set forth.

In witness whereof, I have hereunto set my hand and seal at Farmington, Maine this 30th day of August, A. D. nineteen hundred and sixteen.

JOHN A. JONES. [L. S.]

Witnesses:
  Jos. C. Holman,
  Thelma H. Parker.